(12) United States Patent
Dayrit et al.

(10) Patent No.: US 6,942,821 B2
(45) Date of Patent: Sep. 13, 2005

(54) PROCESS FOR TRIGGERING, STORING, AND DISTRIBUTING AN OXYGEN SCAVENGER, AND A STORED OXYGEN SCAVENGER

(75) Inventors: Richard Dayrit, Simpsonville, SC (US); Scott W. Beckwith, Greer, SC (US); Brian L. Butler, Taylors, SC (US); Ronald L. Cotterman, Greenville, SC (US); Drew V. Speer, Simpsonville, SC (US); Thomas D. Kennedy, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 10/683,103

(22) Filed: Oct. 10, 2003

(65) Prior Publication Data

US 2004/0081584 A1 Apr. 29, 2004

Related U.S. Application Data

(60) Provisional application No. 60/418,654, filed on Oct. 15, 2002.

(51) Int. Cl.[7] .................. C09K 15/04; C09K 15/08; B65B 29/00; C02F 1/70
(52) U.S. Cl. .................. 252/188.28; 252/184; 252/399; 53/400; 210/757; 210/750
(58) Field of Search .................. 252/188.28, 184, 252/399; 210/757, 750; 53/400

(56) References Cited

U.S. PATENT DOCUMENTS

| | | | |
|---|---|---|---|
| 5,021,515 A | | 6/1991 | Cochran et al. |
| 5,211,875 A | | 5/1993 | Speer et al. |
| 5,350,622 A | | 9/1994 | Speer et al. |
| 5,741,385 A | | 4/1998 | Weinberg |
| 5,773,107 A | | 6/1998 | Weinberg |
| 5,859,145 A | | 1/1999 | Ching et al. |
| 5,958,254 A | | 9/1999 | Rooney |
| 5,981,676 A | * | 11/1999 | Gauthier et al. ............ 526/308 |
| 6,214,254 B1 | * | 4/2001 | Gauthier et al. ....... 252/188.28 |
| 6,233,907 B1 | | 5/2001 | Cook, Jr. et al. |
| 6,254,803 B1 | | 7/2001 | Matthews et al. |
| 6,255,248 B1 | | 7/2001 | Bansleben et al. |
| 6,287,481 B1 | | 9/2001 | Luthra et al. |
| 6,346,200 B1 | | 2/2002 | Rooney |
| 6,406,644 B2 | * | 6/2002 | Jerdee et al. .......... 252/188.28 |
| 6,449,923 B1 | | 9/2002 | Cook, Jr. et al. |
| 6,500,559 B2 | * | 12/2002 | Hofmeister et al. ..... 428/474.4 |
| 6,517,728 B1 | * | 2/2003 | Rooney ..................... 210/757 |
| 6,599,487 B1 | * | 7/2003 | Luthra et al. ............ 422/186.3 |
| 6,610,215 B1 | | 8/2003 | Cai et al. |
| 6,632,408 B1 | * | 10/2003 | Luthra et al. ............ 422/186.3 |

FOREIGN PATENT DOCUMENTS

| | | |
|---|---|---|
| WO | WO 94/06626 | 3/1994 |
| WO | WO 96/08371 | 3/1996 |
| WO | WO 97/32925 | 9/1997 |
| WO | WO 98/12250 | 3/1998 |
| WO | WO 99/48963 | 9/1999 |
| WO | WO 02/33024 A2 | 4/2002 |

* cited by examiner

Primary Examiner—Joseph D. Anthony
(74) Attorney, Agent, or Firm—Mark B. Quatt

(57) ABSTRACT

A method includes triggering an oxygen scavenger; and storing the scavenger in a container configured such that the oxygen scavenger exhibits no substantial oxygen scavenging activity while inside the container. The triggered oxygen scavenger can later be removed from the container, and used in packaging oxygen sensitive products. A stored oxygen scavenger, triggered, is also disclosed. A method of distributing an oxygen scavenger film includes providing a tubular film at a first location, the film having oxygen barrier and oxygen scavenger layers; triggering the oxygen scavenger; collapsing the film; rolling up the film; transporting the film to a second location; and triggering the oxygen scavenger. Another method of distributing an oxygen scavenger film includes providing an oxygen scavenger film at a first location; transporting the film to a second location; triggering the oxygen scavenger; storing the oxygen scavenger film in a container; and transporting the film to a third location.

14 Claims, No Drawings

PROCESS FOR TRIGGERING, STORING, AND DISTRIBUTING AN OXYGEN SCAVENGER, AND A STORED OXYGEN SCAVENGER

This application claims the benefit of U.S. Provisional Application No. 60/418,654, filed Oct. 15, 2002.

FIELD OF THE INVENTION

The invention relates to a process for triggering, storing, and distributing an oxygen scavenger, and a stored oxygen scavenger, for use in packaging oxygen sensitive products.

BACKGROUND OF THE INVENTION

It is known that many oxygen sensitive products, including food products such as meat and cheese, smoked and processed luncheon meats, as well as non-food products such as electronic components, pharmaceuticals, and medical products, deteriorate in the presence of oxygen. Both the color and the flavor of foods can be adversely affected. The oxidation of lipids within the food product can result in the development of rancidity. These products benefit from the use of oxygen scavengers in their packaging.

Some of these oxygen scavengers, typically unsaturated polymers with a transition metal catalyst, can be triggered by actinic radiation. Such materials offer the advantage of an oxygen scavenger that does not prematurely scavenge oxygen until such time as the user decides to use the oxygen scavenger in a commercial packaging environment. The oxygen scavenger is thus not triggered until it is passed through a triggering unit, typically a bank of UV lights through which an oxygen scavenger in the form of a film is passed to trigger the oxygen scavenging activity of the material. This is usually done just prior to a packaging step, in which a package having as a component the oxygen scavenger is made, with an oxygen sensitive product placed in the package prior to closure of the package to extend the shelf life of the oxygen sensitive product.

Unfortunately, triggering of the type of oxygen scavenger just described during high speed packaging applications (having a packaging line speed of greater than about 40 feet per minute) presents a challenge with conventional equipment and technology. Conventional triggering units and formulations are practically limited to a maximum line speed of about 20 feet per minute. Conventional triggering equipment is already quite large, and to achieve higher speeds with this technology would require even larger units. The size and associated costs of purchasing or leasing such equipment, maintenance costs, and the requirement of space in the processing plant to accommodate such equipment, can be economically unattractive. Some processors or potential users of oxygen scavenging film do not have room for large equipment.

Another class of oxygen scavengers, which do not require actinic triggering, and thus do not require the associated triggering equipment, are iron-based scavengers and some polymeric scavengers that are provided in active form. Such oxygen scavengers are active at the time of manufacture without triggering by actinic radiation. These also have several disadvantages, however. Some require the presence of moisture to initiate oxygen scavenging. This may not be technically attractive in packaging environments where it is otherwise undesirable or impractical to provide a moisture source to trigger the oxygen scavenger. Also, optics of the finished package can often be undesirably compromised by discoloration or pigmentation of the oxygen scavenger itself, either in its original state or after a period of oxygen scavenging activity. Processing of these oxygen scavengers in a uniformly dispersed way can also prove difficult in conventional extrusion operations. If such scavengers are not dispersed, as is the case with iron based sachets, scavenging activity may be too localized, and uniformity of scavenging may thus not be sufficient in the entire package environment to provide proper and adequate removal of oxygen from the head space of the package, and/or active barrier from subsequent ingress of oxygen from outside the package. Furthermore, oxygen scavenging sachets are unsuitable for vacuum packaging applications.

It has now been found that a solution to these problems is to trigger an oxygen scavenger with actinic radiation or heat, for example in a film converter's facility, and then store the triggered oxygen scavenger in a container such that the oxygen scavenger exhibits no substantial oxygen scavenging activity while inside the container. The stored, triggered oxygen scavenger can then be shipped to a processor. The processor can store the container until such time as the oxygen scavenger is needed for use in a packaging or other application. At that time, the triggered oxygen scavenger is removed from the container, and used as needed in a packaging or other process.

This solution avoids the cost of very large triggering equipment in a processor's plant. Less cost has to be passed on to the processor. In addition, this solution requires no additional space in the processor's plant. A greater proportion of the potential market can then access oxygen scavenging technology. Still retained is the benefit of using an oxygen scavenger whose oxygen scavenging capacity has not been largely and prematurely depleted during storage.

In addition to simply storing the triggered oxygen scavenger in a container, the inventors of this technology have also found it beneficial to store and transport that container at sub-ambient temperature conditions. The inventors have found that by combining the storage of the triggered oxygen scavenger, in an oxygen barrier container (such that the atmosphere in the container has a reduced oxygen atmosphere, achieved by e.g. gas flushing the container atmosphere with an inert gas to achieve a reduced oxygen concentration or by removing the atmosphere with a vacuum packaging system) and then storing the triggered and packaged oxygen scavenger under sub-ambient temperature storage, the potential to deliver the maximum potential oxygen scavenging capacity is improved.

The triggered oxygen scavenger can be wound onto a roll before being stored in the container, and optionally a chilled lay-on roll can be used during the winding process to lower the temperature of the triggered film before and/or during the winding operation. Alternatively, the triggered film can be wrapped around a chilled roll just prior to winding the film onto a roll. Chilled air or rolls can be used in the production of pre-triggered pouches.

Definitions

"Oxygen scavenger" and the like herein means a composition, compound, film, film layer, coating, plastisol, gasket, or the like which can consume, deplete or react with oxygen from a given environment.

"Actinic radiation" and the like herein means radiation or radiant energy that produces chemical changes. Preferred is visible or ultraviolet light, especially UV-C light, and ionizing radiation in the form of X-ray, gamma ray, corona discharge, or electron beam irradiation, capable of causing a chemical change, as exemplified in U.S. Pat. No. 5,211,875 (Speer et al.).

"Trigger" and the like refers herein to that process defined in U.S. Pat. No. 5,211,875, whereby oxygen scavenging is initiated by exposing a composition, film, etc. to actinic radiation having a wavelength of less than about 750 nm at an intensity of at least about 1.6 mW/cm$^2$ or an electron beam at a dose of at least about 0.2 megarads, wherein after initiation the oxygen scavenging rate is at least about 0.05 cc oxygen per day per gram of oxidizable organic compound or other oxygen scavenger for at least two days after oxygen scavenging is initiated. Preferred is a method offering a short "induction period" (the time that elapses, after exposing the oxygen scavenger to a source of actinic radiation, before initiation of the oxygen scavenging activity begins) so that the oxygen scavenger can be triggered at or immediately prior to use during filling of a package with an oxygen sensitive material. In some instances it is known that oxygen scavengers comprising unsaturated polymers with a transition metal catalyst, can be triggered or activated by the heat of the extrusion or blending process, or a subsequent process of forming a packaging article from the composition. Such compositions and methods are disclosed in U.S. Pat. No. 6,610,215 (Cai et al.) incorporated herein by reference as if set forth in full. In these cases, the composition or article is immediately active and is expected to benefit from the storage methods described herein. In addition, such compositions and methods of initiating an oxygen scavenging composition are well suited to the business method described herein.

Thus, "trigger" or the like refers to exposing an oxygen scavenger to actinic radiation as described above or sufficient heat during processing to activate the scavenging reaction; "initiation" refers to the point in time at which oxygen scavenging actually begins; and "induction time" refers to the length of time, if any, between triggering and initiation.

"Container" herein means an enclosure such as a bag, pouch, vessel, sleeve, or the like, that is capable of enclosing or packaging an oxygen scavenger in such a way that the oxygen scavenger exhibits no substantial oxygen scavenging activity while inside the container. "No substantial oxygen scavenging activity while inside the container" herein means that while the oxygen scavenger is in the container, the oxygen scavenging rate of the oxygen scavenger is either 0, or else less than a rate that would deplete the oxygen scavenging activity of the oxygen scavenger, while in the container, to an extent that would render the oxygen scavenger unusable for its intended application. Preferred is an oxygen scavenging rate, while in the container, of less than 0.03 cc oxygen per day per gram of oxidizable organic compound or other oxygen scavenger for at least two days while the oxygen scavenger is in the container.

"Film" herein means a film, laminate, sheet, web, coating, or the like, which can be used to package an oxygen sensitive product. The film can be used as a component in a rigid, semi-rigid, or flexible product, and can be adhered to non-polymeric or non-thermoplastic substrates such as paper or metal. The film can also be used as a coupon or insert within a package.

"Polymer" and the like herein means a homopolymer, but also copolymers thereof, including bispolymers, terpolymers, etc.

"Sub-ambient" and the like herein refers to temperatures of 25° C. or less.

"Refrigerated" and the like herein refers to temperatures of 10° C. or less.

"Structure" and the like herein refers to a film, web, wall, etc. that includes an oxygen scavenger as a component or layer thereof.

All compositional percentages used herein are presented on a "by weight" basis, unless designated otherwise.

SUMMARY OF THE INVENTION

In a first aspect of the invention, a method comprises subjecting an oxygen scavenger to actinic radiation at a dosage sufficient to trigger the oxygen scavenger, or subjecting an oxygen scavenger to heat sufficient to trigger the oxygen scavenger; and then storing the triggered oxygen scavenger in a container, the container configured such that the oxygen scavenger exhibits no substantial oxygen scavenging activity while inside the container.

In a second aspect of the invention, a stored, triggered oxygen scavenger comprises a triggered oxygen scavenger; and a container in which the triggered oxygen scavenger is stored, the container configured such that the oxygen scavenger exhibits no substantial oxygen scavenging activity while inside the container.

In a third aspect of the invention, a method of distributing an oxygen scavenger film comprises providing a tubular film at a first location, the film comprising an oxygen barrier layer, and an oxygen scavenger layer; subjecting the tubular film to actinic radiation at a dosage sufficient to trigger the oxygen scavenger layer, or subjecting the tubular film to heat sufficient to trigger the oxygen scavenger layer; collapsing the tubular film, thereby substantially eliminating air from the interior of the tubular film, such that the resulting oxygen scavenger layers are closer to a collapsed interface of the tubular film than the resulting oxygen barrier layers; rolling up the tubular film on a roll; and transporting the roll of tubular film to a second location.

In a fourth aspect of the invention, a method of distributing an oxygen scavenger film comprises providing a film at a first location, the film comprising an oxygen scavenger layer; transporting the film to a second location; subjecting the film, at the second location, to actinic radiation at a dosage sufficient to trigger the oxygen scavenger layer, or subjecting the film, at the second location, to heat sufficient to trigger the oxygen scavenger layer; storing the triggered oxygen scavenger film in a container, the container configured such that the oxygen scavenger layer exhibits no substantial oxygen scavenging activity while inside the container; and transporting the film to a third location.

The invention is intended to offer a method of shipping untriggered film while protecting the scavenging chemistries from inadvertent or accidental triggering through light or temperature abuse. This methodology can be useful for film exportation which encounters longer and less controlled storage and distribution conditions.

DETAILED DESCRIPTION OF THE INVENTION

The present invention offers the capability of "exporting" the triggering function now performed at e.g. a food processor location where oxygen scavenger materials are needed.

For example, the invention enables a film producer to trigger an oxygen scavenging film in the film producing facility; roll up the triggered oxygen scavenger film into a roll; store the triggered film in an oxygen barrier pouch to temporarily "quench" the oxygen scavenging activity of the triggered oxygen scavenger; and then ship the triggered but quiescent film to the processor or packager. The processor, packager, or other user can then remove the triggered oxygen scavenger film roll from the container as needed in the course of a typical packaging process. He can put the roll on a feed mechanism that feeds the film off the roll and into a packaging line where the film becomes a component of a package for packaging an oxygen sensitive product.

Alternatively, the user can remove the triggered oxygen scavenger film roll as needed, and use the film as a component of a laminate web, e.g. a laminate web that includes the triggered film as a layer. This laminate in turn can be used in making a package. Thus, the user can be an intermediate converter who in turn uses the laminate to make a finished package, or provides the laminate to a third party for further use.

In another alternative, the user can remove the triggered oxygen scavenger film roll as needed, and the film can be adhered to a paperboard or metalized substrate and further processed.

In yet another alternative, the manufacturer can make a partially finished package that includes the oxygen scavenger as a component; trigger the partially finished package (or trigger the oxygen scavenger component before it is made into the partially finished package); store the partially finished package or multiple units thereof in an oxygen barrier pouch, box, or other container to temporarily "quench" the oxygen scavenging activity of the triggered oxygen scavenger; and then ship the triggered but quiescent partially finished package(s) to the processor or packager. The processor, packager, or other user can then remove the one or plurality of partially finished packages from the container as needed in the course of a typical packaging process. He can then insert an oxygen sensitive product in or on each partially finished package, and complete and close each package.

An example of a partially finished package is a thermoformed tray with a oxygen scavenger component, or a liner on the tray with an oxygen scavenger component, which can be completed by inserting an oxygen sensitive product, and then applying a lidding film to close and complete each package.

Another example of a partially finished package is barrier paperboard such as that used for juice cartons that incorporates an oxygen scavenger. The triggering of such opaque containers is described in U.S. Pat. No. 6,233,907 (Cook et al.) incorporated herein by reference in its entirety.

Another example of a partially finished package is a pouch with an oxygen scavenger component. Examples of such pouches include stand up pouches, flat pouches, and pouches with fitments. The package is completed by inserting an oxygen sensitive product, and then applying the required seals to create a hermetic package.

In the case of a pouch, it is possible to create a hermetic pouch where the scavenging component is effectively isolated from the exterior environment by using a passive oxygen barrier material, used as a layer in the package structure, located in a position within the composition of the package between the oxygen scavenging component and the external environment. Processors in this case would remove or open one seal, insert the oxygen sensitive component, and then reseal or create a new seal that reestablishes the hermeticity of the package. In this case the passive oxygen barrier used in the package creates the conditions necessary to temporarily "quench" the oxygen scavenging activity of the triggered oxygen scavenger.

The Container

The container in each of the above embodiments is configured such that the oxygen scavenger exhibits no substantial oxygen scavenging activity while inside the container. "Configured" herein means that the physical and chemical structure of the container, and the materials making up the container, is selected such that there is no substantial depletion of the oxygen scavenging capacity of the stored oxygen scavenger while the oxygen scavenger is stored in the container.

This can be achieved by the use of container formats such as high barrier pouches made from materials having an oxygen permeability, of the barrier material, less than 500 $cm^3$ $O_2/m^2 \cdot day \cdot atmosphere$ (tested at 1 mil thick and at 25° C. according to ASTM D3985), such as less than 100, less than 50, less than 25, less than 10, less than 5, and less than 1 $cm^3$ $O_2/m^2 \cdot day \cdot atmosphere$. Examples of polymeric materials with low oxygen transmission rates are ethylene/vinyl alcohol copolymer (EVOH), polyvinylidene dichloride (PVDC), vinylidene chloride/methyl acrylate copolymer, polyamide, and polyester.

Alternatively, metal foil or alumina or $SiO_x$ compounds can be used to provide low oxygen transmission to the container. Metallized foils can include a sputter coating or other application of a metal or metal oxide layer to a polymeric substrate such as those described above, or to high density polyethylene (HDPE) or other polyolefins, ethylene/vinyl alcohol copolymer (EVOH), polypropylene (PP), polyethylene terephthalate (PET), polyethylene naphthalate (PEN), polyamide (PA), and the like.

Even a sufficiently thick layer of a polyolefin such as linear low density polyethylene (LLDPE), or PVC (polyvinyl chloride) can in some instances provide a sufficiently low oxygen transmission rate for the overall film for its intended function. The exact oxygen permeability optimally required for a given application can readily be determined through experimentation by one skilled in the art.

Monolayer or multilayer films with one or more layers of the barrier material can be made using conventional extrusion, coextrusion, or lamination processes, and conventional pouch, bag, or box manufacturing processes.

Hermetic sealing of the pouch, bag, or other container will typically be necessary to prevent environmental oxygen from outside the container from entering the container and depleting some part of the oxygen scavenging capacity of the triggered oxygen scavenger. Sufficiently low storage temperatures can obviate the need for a hermetically sealed container.

In some cases, vacuumization of the container, and/or gas flushing of the container with an inert gas such as nitrogen or carbon dioxide, before closure, can be useful in preventing, reducing, or delaying premature oxygen scavenging activity of the oxygen scavenger while stored in the container.

Keeping the interior of the container at subambient (25° C. or less) or refrigerated (10° C. or less) temperatures can likewise prevent or reduce premature oxygen scavenging activity. Very low storage temperatures (such as −10° C. to −196° C.) can eliminate the need for the container to comprise an oxygen barrier.

The container can be substantially opaque to UV and/or visible light.

The exact requirements of the container will depend on a variety of factors, including the chemical nature of the oxygen scavenger, amount of the oxygen scavenger, concentration of the oxygen scavenger in a host material or diluent, physical configuration of the oxygen scavenger, presence of hermetic sealing, vacuumization and/or modified atmosphere inside the container, initial oxygen concentration inside the container, intended end use of the oxygen scavenger, intended storage time of the container before use, level of dose of actinic radiation, etc.

The triggering dose could be provided at high speeds during manufacture using equipment that may not be suitable for installation at a customer plant. Examples include high output germicidal lamps, medium-pressure arc lamps, pulsed xenon lamps or electron beam radiation. Triggering with pulsed light is disclosed in U.S. Pat. No. 6,449,923 (Cook et al.) and is incorporated herein by reference in its entirety. The dose of actinic radiation might include e-beam as part of a film manufacturing step.

Keeping the oxygen scavenger substantially preserved until the point in time when the processor wishes to make use of the oxygen scavenger is highly desirable. The processor is enabled to deliver scavenging materials with the maximum potential oxygen scavenging capacity.

It has been found beneficial to store and transport the container at sub-ambient temperature conditions. The inventors have found that by storing the triggered oxygen scavenger, in an oxygen barrier container (e.g. such that the atmosphere in the container has a reduced oxygen atmosphere, achieved by gas flushing the container atmosphere with an inert gas to achieve a reduced oxygen concentration or by removing the atmosphere with a vacuum packaging system) at sub-ambient temperatures, the potential to deliver the maximum potential oxygen scavenging capacity is improved.

The Oxygen Scavenger

Oxygen scavengers suitable for commercial use in articles of the present invention, such as films, are disclosed in U.S. Pat. No. 5,350,622, and a method of initiating oxygen scavenging generally is disclosed in U.S. Pat. No. 5,211,875. Suitable equipment for initiating oxygen scavenging is disclosed in U.S. Pat. No. 6,287,481 (Luthra et al.). These patents are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon, which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Examples of unsubstituted ethylenically unsaturated hydrocarbons include, but are not limited to, diene polymers such as polyisoprene, (e.g., trans-polyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene/butadiene copolymer and styrene/isoprene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, 1,7-octadiene, or other monomers containing more than one carbon-carbon double bond (conjugated or non-conjugated).

Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more is preferred, an ethylenically unsaturated hydrocarbon having a lower molecular weight is usable, especially if it is blended with a film-forming polymer or blend of polymers.

Other oxygen scavengers, which can be used in connection with this invention are disclosed in U.S. Pat. No. 5,958,254 (Rooney), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound that has absorbence in the UV spectrum. An additional example of oxygen scavengers which can be used in connection with this invention are disclosed in PCT patent publication WO 99/48963 (Chevron Chemical et al.), and U.S. Pat. No. 6,254,803 (Matthews et al.), incorporated herein by reference in their entirety. These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone.

An oxygen scavenging composition suitable for use with the invention comprises:
(a) a polymer or lower molecular weight material containing substituted cyclohexene functionality according to the following diagram:

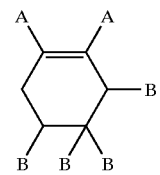

where A may be hydrogen or methyl and either one or two of the B groups is a heteroatom-containing linkage which attaches the cyclohexene ring to the said material, and wherein the remaining B groups are hydrogen or methyl;
(b) a transition metal catalyst; and optionally
(c) a photoinitiator.

The compositions may be polymeric in nature or they may be lower molecular weight materials. In either case they may be blended with further polymers or other additives. In the case of low molecular weight materials they will most likely be compounded with a carrier resin before use.

When used in forming a packaging article, the oxygen scavenging composition of the present invention can include only the above-described polymers and a transition metal catalyst. However, photoinitiators can be added to further facilitate and control the initiation of oxygen scavenging properties. Suitable photoinitiators are known to those skilled in the art. Specific examples include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)benzophenone, acetophenone and its derivatives, such as, o-methoxy-acetophenone, 4'-methoxy-acetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, 2,4,6-trimethylbenzoyldiphenylphosphine oxide, bis(2,4,6-trimethylbenzoyl)phenylphosphine oxide, ethyl-2,4,6-trimethylbenzoylphenyl phosphinate, bis(2,6-dimethoxybenzoyl)-2,4,4-trimethylpentyl phosphine oxide, benz[a]anthracene-7,12-dione, 2,2-dimethoxy-2-phenylacetophenone, α,α-diethoxyacetophenone, α,α-dibutoxyacetophenone, 4-benzoyl-4'-methyl(diphenyl sulfide) and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl]propanone] also can be used. The amount of photoinitiator can depend on the amount and type of cyclic unsaturation present in the polymer, the wavelength and intensity of radiation used, the nature and amount of antioxidants used, and the type of photoinitiator used.

Also suitable for use in the present invention is the oxygen scavenger of U.S. Pat. No. 6,255,248 (Bansleben et al.), incorporated herein by reference in its entirety, which discloses a copolymer of ethylene and a strained, cyclic alkylene, preferably cyclopentene; and a transition metal catalyst.

Another oxygen scavenger that can be used in connection with this invention is the oxygen scavenger of WO 00/00538, published Jan. 6, 2000, incorporated herein by reference in its entirety, which discloses ethylene/vinyl aralkyl copolymer and a transition metal catalyst.

As indicated above, the ethylenically unsaturated hydrocarbon is combined with a transition metal catalyst. Suitable metal catalysts are those that can readily interconvert between at least two oxidation states.

Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate, cobalt oleate, cobalt stearate, and cobalt (II) neodecanoate. The metal salt may also be an ionomer, in which case a polymeric counterion is employed. Such ionomers are well known in the art.

Any of the above-mentioned oxygen scavengers and transition metal catalyst can be further combined with one or more polymeric diluents, such as thermoplastic polymers that are typically used to form film layers in plastic packaging articles. In the manufacture of certain packaging articles well known thermosets can also be used as the polymeric diluent.

Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, antifog agents, etc.

The mixing of the components listed above is preferably accomplished by melt blending at a temperature in the range of 50° C. to 300° C. However, alternatives such as the use of a solvent followed by evaporation may also be employed.

Oxygen scavenging structures can sometimes generate reaction byproducts, which can affect the taste and smell of the packaged material (i.e. organoleptic properties), or raise food regulatory issues. This problem can be minimized by the use of polymeric functional barriers. Polymeric functional barriers for oxygen scavenging applications are disclosed in WO 96/08371 to Ching et al. (Chevron Chemical Company), WO 94/06626 to Balloni et al., and WO 97/32, 925, and EP 0927221 B1 (Miranda et al.), all of which are incorporated herein by reference as if set forth in full, and include high glass transition temperature ($T_g$) glassy polymers such as polyethylene terephthalate (PET) and nylon 6 that are preferably further oriented; low $T_g$ polymers and their blends; a polymer derived from a propylene monomer; a polymer derived from a methyl acrylate monomer; a polymer derived from a butyl acrylate monomer; a polymer derived from a methacrylic acid monomer; polyethylene terephthalate glycol (PETG); amorphous nylon; ionomer; a polymeric blend including a polyterpene; and poly (lactic acid). The functional barriers can be incorporated into one or more layers of a multilayer film or other article that includes an oxygen scavenging layer.

EXAMPLES

Example 1

An oxygen scavenger film was produced having the following structure:

| Layer 1 | Layer 2 | Layer 3 | Layer 4 | Layer 5 | Layer 6 |
|---------|---------|---------|---------|---------|---------|
| 0.25    | 0.15    | 0.5     | 2.00    | 0.1     | 0.54    |

The thickness of each layer is indicated in the above table. The total thickness of the film was 3.54 mils.

Compositionally, each layer was formulated as follows:

Layer 1 was a blend of 60%, by weight of the blend, of an single site catalyzed ethylene/hexene copolymer, and 40%, by weight of the blend, of a polyethylene-based silica/antioxidant masterbatch.

Layer 2 was a blend of 50%, by weight of the blend, of a propylene/ethylene copolymer, and 40%, by weight of the blend, of a ethylene/methyl acrylate copolymer.

Layer 3 was a blend of 45%, by weight of the blend, of an ethylene/vinyl acetate copolymer, 40%, by weight of the blend, of a styrene/butadiene copolymer, and 15%, by weight of the blend, of an ethylene/vinyl acetate copolymer-based masterbatch containing a photoinitiator and a transition metal catalyst.

Layer 4 was a blend of 35%, by weight of the blend, of an ethylene/vinyl acetate copolymer, 60%, by weight of the blend, of a linear low density polyethylene, and 5%, by weight of the blend, of a polyethylene-based silica/antioxidant masterbatch.

Layer 5 was a polyurethane-based adhesive.

Layer 6 was a saran-coated polyethylene terephthalate.

Layers 1 through 4 were coextruded by conventional coextrusion techniques. The coated polyethylene terephthalate was then adhered to the substrate of layers 1 to 4 by means of the polyurethane-based adhesive.

The film was triggered on a CRYOVAC® 4104 triggering unit having two banks of UV lights at a dosage of 800 millijoules/centimeter$^2$. The triggered film was immediately thereafter processed on a Multivac® R-230 thermoforming machine. PVC film having a thickness of between 12 and 14 mils was used as the bottom thermoforming web (tray), and the oxygen scavenger film formed the top web (lidstock). The bottom PVC web formed no direct part of the test, but was run simply to allow the thermoforming machine to produce a continuous lidstock web.

After the thermoforming/lidding step, the top web was cut from the top of the packages into rectangular pieces measuring about 5 inches wide and about 7 inches long. Ten film samples were thus made.

Each film sample was individually loosely rolled up, and placed in a separate pouch. Each pouch was a commercial high oxygen barrier, saran (PVDC or vinylidene chloride/vinyl chloride or vinylidene chloride/methyl acrylate copolymer) pouch, P640B® available from Cryovac, having a thickness of about 2.3 mils.

The P640B pouch has the following structure:

| PVDC-coated Nylon 6 film | Adhesive | LLDPE |
| --- | --- | --- |

Each pouch was vacuumized and sealed in a Koch Ultravac™ 250, and then placed in another pouch of the same type, which was also vacuumized and sealed.

Finally, the double pouch arrangement was placed inside an opaque metal foil wrap and sealed.

After four weeks, the ten foil wrapped double pouch samples were processed further as follows.

The opaque metal foil wrap of each double pouch sample was removed, and the innermost of each of the ten double pouches was filled with about 300 cubic centimeters of an atmosphere of either 20.6% oxygen (air) or 1.0% oxygen.

Headspace $O_2$ analysis was conducted on the ten samples after they were filled to determine the initial headspace concentration. Similar analysis was done one day after, 5 days after, and 18 days after filling.

During this period, the samples were kept at ambient temperature, about 70° F.

The data of Table 1 demonstrates that without a second triggering step, oxygen scavenging activity occurred/resumed (see samples A, B, H, J). Thus, triggering the oxygen scavenger followed by storage of the triggered oxygen scavenger in a container that prevented substantial oxygen scavenging activity, substantially preserved the oxygen scavenging activity of the oxygen scavenger for later use.

TABLE 1

Oxygen scavenging activity of triggered oxygen scavenger stored 1 month

| | Sample | Day 0 % $O_2$ | Day 1 % $O_2$ | Day 5 % $O_2$ | Day 18 % $O_2$ |
| --- | --- | --- | --- | --- | --- |
| 20.6% $O_2$ | A | 20.6 | 17.2 | 16.0 | 16.0 |
| Ambient temperature | B | 20.6 | 17.1 | 15.8 | 15.6 |
| 1.6% $O_2$ | H | 1.10 | 0.733 | 0.504 | 0.467 |
| Ambient temperature | J | 1.06 | 0.434 | 0.242 | 0.404 |

Example 2

An oxygen scavenging multilayered film like Example 1 was triggered on a CRYOVAC® 4104V triggering unit. In this film, layer 3 was 90% poly(ethylene-methyl acrylate/cyclohexene-methyl acrylate) (EMCM) available from Chevron-Phillips, and 10% ethylene/methyl acrylate (EMA) masterbatch containing photoinitiator and transition metal catalyst with a thickness of 0.75 mil. Layer 4 was 100% LLDPE with a thickness of 1.5 mil. Layers 1 and 2 were both a blend of 94% LLDPE and 7% antiblock masterbatch with a total thickness of 0.25 mil. All four light banks were activated, and film was run at a speed of 10 feet per minute, providing a dose to the film of about 712 mJ/cm$^2$. Triggered film was cut into 10×10 cm pieces. This triggered film was wrapped on 3 inch cores, vacuum packaged twice in Cryovac TBG™ bags, and placed in 9×16 inch foil bags (Georgia Packaging Inc., FOIL-O-RAP™ 2175-B). Bags were vacuum packaged and sealed, and stored in the dark at 75° F. for 24 hours.

Bags were then refilled with 2000 cc of 1% $O_2$ or 3000 cc of 0.5% $O_2$. Residual headspace oxygen was measured using the Mocon PACCHECK™ 400 on days 0, 5, 7, 14, 21, and 31 or 32.

Day 1 Testing

After 24 hours, the TBG bags were removed and the film was taken from the outside of roll, middle of roll, and inside of roll close to the core. The procedure described above was then followed.

TABLE 2

Capacity of film when testing was started at time 0.

| Initial $O_2$ | Avg. Capacity (cc/m$^2$/mil) | Capacity Range (cc/m$^2$/mil) | Day of peak capacity |
| --- | --- | --- | --- |
| 1% | 741.5 | 725–770 | 32 |
| 0.5% | 636.3 | 470–802 | 32 |

TABLE 3

Capacity of film when testing was started one day after triggering.

| Initial O$_2$ | Avg. Capacity (cc/m$^2$/mil) | Capacity Range (cc/m$^2$/mil) | Day of peak capacity |
|---|---|---|---|
| 1% | 567.0 | 429–727 | 31 |
| 0.5% | 438.4 | 371–595 | 21–31 |

These data show that film can be triggered and stored for at least 1 day and retain substantial oxygen scavenging capacity.

Example 3

The triggered film of example 2 in the form of a roll was vacuum packaged in Cryovac barrier bags, and placed in a Styrofoam cooler surrounded by dry ice (~−78° C.). The triggered film was stored in that state for up to 7 days. Samples of film were tested without storage (time zero) and at 1, 2, 3, 4, and 7 days. For testing scavenging activity, triggered film was cut into 10×10 cm pieces and vacuum packaged in 9×16 inch foil pouches (Georgia Packaging Inc., FOIL-O-RAP™ 2175-B). The pouches were inflated with 3050 cc of nominally 1% oxygen atmosphere. Residual headspace oxygen was measured using the Mocon PAC-CHECK™ 400 at various times through 64 days of testing at room temperature.

The average oxygen scavenging rate is calculated by considering only the end points, with the following formula: Average Rate=cc O$_2$ scavenged/(m$^2$·day), and in these examples was calculated about 4 days after UV triggering. The peak (instantaneous) rate is the highest scavenging rate observed during any sampling period, and is given by: Δcc O$_2$ scavenged/(m$^2$·Δday), where Δ is the incremental change between two consecutive measurements. Capacity was calculated as the total cc O$_2$ scavenged/(m$^2$·mil) where the thickness refers only to the scavenging layer within the structure. SD refers to the standard deviation of four replicate samples. The results are shown below in Table 4.

TABLE 4

Oxygen Scavenging Performance for Pre-triggered Film Stored at −78° C.

| Storage Time (days) | Average Rate (cc/m$^2$/d) | SD | Instantaneous Rate (cc/m$^2$/d) | SD | Capacity (cc/m$^2$/mil) | SD |
|---|---|---|---|---|---|---|
| 0 | 54.1 | 10.7 | 98.5 | 16.3 | 714 | 74 |
| 1 | 64.4 | 7.8 | 100 | 8.5 | 716 | 81 |
| 2 | 77.1 | 9.1 | 103.5 | 26 | 830 | 60 |
| 3 | 61.7 | 3.3 | 97.1 | 22 | 727 | 68 |
| 4 | 63.1 | 8.3 | 85.2 | 15 | 780 | 26 |
| 7 | 66.0 | 1.3 | 77.5 | 5.0 | 727 | 31 |

The somewhat high standard deviations in the capacity tests at time zero, one two and three are believed to be due at least in part to leaky test packages. These data show that scavenging rate and capacity properties are substantially maintained by low temperature storage of pre-triggered oxygen scavenging film for at least 7 days.

Example 4

The film of example 2 was triggered using a Cryovac model 4104V Scavenging Initiation System with a dose of either 300 or 800 mJ/cm$^2$. The film was stored vacuum packaged in barrier pouches at room temperature. Oxygen scavenging activity was determined as in example 1, after 1 day, 14 days and 28 days of storage. The results are shown below in Table 5.

TABLE 5

Oxygen Content of Refrigerated Test Packages
Refrigerated MAP test with ~1% Initial Oxygen Concentration

| Dose (mJ/cm$^2$) | Time After Triggering (days) | Oxygen Content (percent) | | | | |
|---|---|---|---|---|---|---|
| | | Day 0 | Day 1 | Day 4 | Day 7 | Day 14 |
| 800 | 1 | 1.37 | 1.14 | 0.286 | 0.124 | 0.059 |
| 800 | 14 | 1.08 | 1.09 | 0.451 | 0.188 | 0.078 |
| 800 | 28 | 1.17 | 1.19 | 0.517 | 0.169 | 0.061 |
| 300 | 1 | 1.33 | 1.09 | 0.290 | 0.107 | 0.059 |
| 300 | 14 | 1.11 | 1.13 | 1.04 | 0.386 | 0.082 |
| 300 | 28 | 1.08 | 1.11 | 1.06 | 0.397 | 0.058 |

These results show that OS Film can be triggered and stored for at least 28 days with little loss in overall oxygen scavenging ability. Some decline in scavenging rate is noted on day 1 and 4, but this decline is of little consequence after 14 days of testing.

Example 5

The oxygen scavenging film of Example 1 was triggered as described in example 1 to a dose of 800 mJ/cm$^2$ using a model 4104 Scavenging Initiation System. The film was vacuum packaged in a Cryovac P640B™ pouch and stored at room temperature in the dark for 624 days. After 624 days, the P640B™ pouch was opened and 10×10 cm samples were sealed in a P640B pouch with 300 cc of 1% oxygen and refrigerated. Oxygen content in the pouch was monitored with the following results.

TABLE 6

Oxygen Content of Test Pouches
Triggered Film After 624 days of Storage, Refrigerated MAP Test

| Sample | Oxygen Content (percent) | | | | | |
|---|---|---|---|---|---|---|
| | Day 0 | Day 1 | Day 4 | Day 7 | Day 14 | Day 21 |
| 1 | 1.32 | 1.14 | 0.961 | 0.765 | 0.524 | 0.397 |
| 2 | 1.34 | 1.12 | 0.911 | 0.735 | 0.489 | 0.371 |

This example shows that scavenging activity can be preserved to some extent even after storage for 624 days at room temperature.

Difficulty can be experienced with maintaining the oxygen scavenging structure in an inactive state, particularly when long storage times and elevated storage temperature conditions are present. The effective distribution of the material can thus be difficult. Protection from oxygen, light, elevated temperature and any combination of these three phenomena can significantly shorten the stable life of the UV activatable scavenging film.

This invention provides a solution to the difficulties associated with storage and distribution of triggered oxygen scavenging structures.

ALTERNATIVE EMBODIMENTS

In one alternative embodiment, the structure comprises an oxygen barrier layer, and an oxygen scavenger layer. In another embodiment, the structure comprises an oxygen barrier layer, an oxygen scavenger layer, and a sealant layer. These structures can be produced in an annular, tubular form, e.g. by an otherwise conventional cast or blown coextrusion process; the tube thus produced is collapsed, such that air is substantially eliminated from the interior of the tube, and the collapsed structure is wound up on a roll. ("Substantially" with respect to the elimination of air herein means that any air remaining inside the tube will not affect the oxygen scavenging rate or capacity of the material sufficient to render the film unusable for its intended purpose.) The oxygen scavenger layer is located toward the inside of the collapsed tube with the oxygen barrier layer located to the exterior (relative to the oxygen scavenging layer) of the tube.

The collapsed tube would thus be constructed in cross section as:
Oxygen barrier
Oxygen scavenger
Oxygen scavenger
Oxygen barrier
or as
Oxygen barrier
Oxygen scavenger
Sealant
Sealant
Oxygen scavenger
Oxygen barrier Additional layers, such as functional barriers, tie or adhesive layers, bulk layers, abuse layers, etc. can be added to these films either internally or externally, or both, as needed either by inclusion in the extrusion process or by lamination as is well known in the art.

The collapsed roll of film can then be transported to a second location (either within the same facility or at a separate location). Any desired conversion operations can be performed, such as unrolling the collapsed tubular film, slitting the edges, and winding the opposite panels of the tubing onto separate rolls. The now single wound film on the separate rolls can now be triggered as described herein, either before, during, or after the tubular film has been edge slit and separately rewound. The film can alternatively be further converted into other finished products. If no conversion operations are performed at the second location, the collapsed tubular film can be simply unrolled from the roll, and triggered.

The second location can thus take the form of a customer location where the film will eventually be processed and made into a package.

Alternatively, the second location can be a regional, intermediate conversion operation or distribution point, such as one operated by the film manufacturer, or by a distributor of the manufacturer. After triggering and any additional processing, the triggered film is transported to a third location, which can be e.g. a customer location.

The film is triggered by actinic radiation, either just after extrusion or at some time before being wound up on a core. Alternatively, the heat of the extrusion process or heat applied during a subsequent process triggers the structure.

For example, the tubular structure can be triggered and then collapsed, or vice versa.

In the method described above, the structure in the form of a web can be collapsed and rolled up on a roll in a single operation.

Because the tube contains little or no atmosphere, and the oxygen transmission rate through the oxygen barrier layer is minimized, the oxygen scavenging activity of the oxygen scavenging layer, once triggered by heat or actinic radiation, can thus be effectively controlled.

The film can be transported to a second location (either within the same facility or at a separate location), the edges slit off, and the opposite sides of the tubing wound onto separate rolls. The film can then be converted into a finished product. Such finished articles may include laminations such as lidding film, thermoformable rigid and semi-rigid webs, and barrier paperboard constructions.

This method of distribution eliminates the need for specialized barrier packaging in that the film itself minimizes the scavenger layer's exposure to oxygen.

Packaging large rolls of scavenger materials for export to foreign countries where converting into the finished packaging product will take place, would be difficult. Finding a large enough barrier pouch, a method to exclude light and oxygen are expensive. This method provides a solution to this difficulty. No special or costly packaging materials are required. The customer can simply separate the tubing into separate rolls of film. This can be performed in an otherwise conventional converting operation.

In another alternative embodiment, in accordance with the present invention, an oxygen scavenger web can be provided by suitable extrusion methods; the web can then be triggered, then the triggered web, e.g. in the form of a roll, can be stored, e.g. using modified atmosphere packaging (MAP) or vacuum packaging, in a container, the container configured such that the oxygen scavenger exhibits no substantial oxygen scavenging activity while inside the container. The stored container can then be transported to a film user, such as a food processor. The user can take the triggered oxygen scavenger web out of the container, and use the material on a packaging line for packaging an oxygen sensitive product such as food. The MAP and/or vacuum packaging of the roll reduces the amount of oxygen that can reach the now triggered oxygen scavenger structure. It is thus possible to deliver a pre-triggered oxygen scavenger that allows the processor/packager to use the material without having to trigger it. The result of using the MAP or vacuum packaging method in an oxygen barrier package or like container prevents any substantial loss of oxygen scavenging capacity for the intended shelf life of the composition. "Shelf life" herein refers to the period of time during which the oxygen scavenger structure can be triggered (if untriggered), or if triggered, maintains sufficient oxygen scavenging rate and capacity to be commercially useful for the intended end use of the structure.

The oxygen scavenger construction can thus be triggered in or during a manufacturing process (as a separate triggering process step) or in combination with another converting process (as e.g. in combination with a pouch making process or a slitting process). The then triggered oxygen scavenger is packaged in a container, the container configured such that the oxygen scavenger exhibits no substantial oxygen scavenging activity while inside the container, e.g. in a barrier package, to prevent the ready access of oxygen to the now oxygen scavenging structure, and/or at a temperature that reduces the rate of oxygen scavenging.

Once triggered, if the scavenger is completely removed from oxygen, it is possible to substantially reduce the oxygen scavenging capacity of the composition. At worst, the oxygen scavenging behavior can be irreversibly extinguished.

To avoid this, it is beneficial to use the material as soon as possible after triggering. Even if the web is triggered and then MAP or vacuum packaged and/or shipped or stored at refrigerated or frozen temperatures, if the pre-triggered web can be re-exposed to the atmosphere quickly enough, the risk that the scavenging behavior will be extinguished is minimized or eliminated. Webs can be vacuum packaged in barrier bags, at room temperature conditions, for up to about one week without substantial reduction in scavenging performance.

As such, in an alternative embodiment, a business method is as follows.

A dormant oxygen scavenger web (prior to heat or actinic radiation triggering) is produced in a central manufacturing location by any conventional method such as extrusion, coextrusion, lamination, or the like; optionally stored, and then transported to a second location. The film can be transported as is, shipped in a barrier or other container, or in a container configured such that the oxygen scavenger exhibits no substantial oxygen scavenging activity while inside the container.

The second location will be e.g. a remote location, such as a regional distribution hub. At the second location, the dormant web is optionally converted (such as being slit to desired widths into finished rolls, ply separated, laminated, and/or converted into bags or pouches), and the resulting structure is triggered. Any converting operations can be performed either before, after or during the triggering step.

The film, once triggered, either in the form of a roll or in the form of bags, pouches preforms, etc., is then stored by any suitable means, such as vacuum packaging or MAP packaging the triggered article, bag, etc. in a container configured such that the oxygen scavenger exhibits no substantial oxygen scavenging activity while inside the container.

The packaged triggered oxygen scavenging material can then be shipped to a third location, which can be the location of an end user, such as a food processor or packager of oxygen sensitive materials. The quantity of oxygen scavenging material that is triggered can be adequate to support the user's packaging requirements for from 1 to 21 days. The respective locations can be such that a dormant oxygen scavenger article, bag, etc. can be triggered, packaged, and transported to the user within 1 to 3 calendar days. This allows users to use the triggered oxygen scavenging materials within 4 to 20 days, such as within 4 to 6 days.

The minimum dosage of actinic radiation to which the oxygen scavenger needs to be subjected to effect triggering will vary according to many factors, including but not limited to the intensity and wavelength of the UV bulbs or other actinic source, the nature of the oxygen scavenger, the speed of the triggering equipment being used, the temperature of the film, etc. In many cases, a dosage of at least 200 mJ/cm$^2$ will be sufficient; in some cases, a minimum of at least 300 or 400 mJ/cm$^2$, or even at least 600 mJ/cm$^2$ may be needed. Thus, e.g. dosages of 200 to 10,000 mJ/cm$^2$, such as 400 to 8,000 mJ/cm$^2$, such as 500 to 7,000 mJ/cm$^2$ may be suitable, e.g. 1,000 to 5,000 mJ/cm$^2$.

Any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

The invention is not limited to the illustrations described herein, which are deemed to be merely illustrative, and susceptible of modification of form, size, arrangement of parts and details of operation.

For example, although actinic radiation and heat are disclosed herein as alternative mechanisms for triggering an oxygen scavenger, these two mechanisms can be used simultaneously to effect triggering.

What is claimed is:

1. A method comprising:
    a) subjecting a thermoformed tray with an oxygen scavenger component to actinic radiation at a dosage sufficient to trigger the oxygen scavenger component; and then
    b) storing the triggered thermoformed tray with an oxygen scavenger component in a container, the container configured such that the thermoformed tray with an oxygen scavenger component exhibits no substantial oxygen scavenging activity while inside the container;
    wherein the oxygen scavenger component comprises a material selected from the group consisting of:
        i) a reduced form of a quinone, a photoreducible dye, or a carbonyl compound which has absorbence in the UV spectrum,
        ii) a polymer having a polymeric backbone, cyclic olefinic pendent group, and linking group linking the olefinic pendent group to the polymeric backbone,
        iii) a copolymer of ethylene and a strained, cyclic alkylene, and
        iv) ethylene/vinyl aralkyl copolymer; and
    wherein the actinic radiation comprises a form of irradiation selected from visible light, ultraviolet light, and ionizing radiation in the form of X-ray, gamma ray, corona discharge, or electron beam irradiation.

2. The method of claim 1 wherein the thermoformed tray with an oxygen scavenger component is subjected to actinic radiation at a dosage of at least 300 mJ/cm$^2$.

3. The method of claim 1 wherein the container comprises a film comprising:
    a) a layer comprising an oxygen scavenger; and
    b) a layer comprising a polymer having an oxygen transmission rate of less than 500 cm$^3$/m$^2$·day·atm (ASTM D 3985-95).

4. The method of claim 1 wherein the container comprises an opaque material.

5. The method of claim 1 wherein the container comprises a material selected from the group consisting of:
    a) a metal foil;
    b) a metallized foil; and
    c) an oxide coated web.

6. The method of claim 1 wherein the container is in the form of a pouch.

7. The method of claim 1 wherein the triggered thermoformed tray with an oxygen scavenger component is stored in the container at subambient temperatures.

8. A method comprising:
    a) subjecting a thermoformed tray, with a liner on the tray with an oxygen scavenger component, to actinic radiation at a dosage sufficient to trigger the oxygen scavenger; and then
    b) storing the triggered thermoformed tray, with a liner on the tray with an oxygen scavenger component, in a container, the container configured such that the thermoformed tray, with a liner on the tray with an oxygen scavenger component, exhibits no substantial oxygen scavenging activity while inside the container;
    wherein the oxygen scavenger component comprises a material selected from the group consisting of:
        i) a reduced form of a quinone, a photoreducible dye, or a carbonyl compound which has absorbence in the UV spectrum,
        ii) a polymer having a polymeric backbone, cyclic olefinic pendent group, and linking group linking the olefinic pendent group to the polymeric backbone, iii) a copolymer of ethylene and a strained, cyclic alkylene, and iv) ethylene/vinyl aralkyl copolymer; and wherein the actinic radiation comprises a form of irradiation selected from visible light, ultraviolet light, and ionizing radiation in the form of X-ray, gamma ray, corona discharge, or electron beam irradiation.

9. The method of claim 8 wherein the thermoformed tray, with a liner on the tray with an oxygen scavenger component, is subjected to actinic radiation at a dosage of at least 300 mJ/cm$^2$.

10. The method of claim 8 wherein the container comprises a film comprising:

a) a layer comprising an oxygen scavenger; and b) a layer comprising a polymer having an oxygen transmission rate of less than 500 cm$^3$/m$^2$·day·atm (ASTM D 3985-95).

11. The method of claim 8 wherein the container comprises an opaque material.

12. The method of claim 8 wherein the container comprises a material selected from the group consisting of:

a) a metal foil;

b) a metallized foil; and c) an oxide coated web.

13. The method of claim 8 wherein the container is in the form of a pouch.

14. The method of claim 8 wherein the triggered thermoformed tray, with a liner on the tray with an oxygen scavenger component, is stored in the container at subambient temperatures.

* * * * *